(12) United States Patent
Beadle et al.

(10) Patent No.: US 12,071,096 B2
(45) Date of Patent: Aug. 27, 2024

(54) WEB LENGTH ADJUSTER

(71) Applicant: Indiana Mills & Manufacturing, Inc., Westfield, IN (US)

(72) Inventors: Nathan Andrew Beadle, Westfield, IN (US); Matthew Grubbs Farrar, Westfield, IN (US); Chris P. Jessup, Sheridan, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 0 days.

(21) Appl. No.: 18/065,750

(22) Filed: Dec. 14, 2022

(65) Prior Publication Data
US 2024/0198953 A1 Jun. 20, 2024

(51) Int. Cl.
*A44B 11/12* (2006.01)
*B60R 22/30* (2006.01)

(52) U.S. Cl.
CPC ............ *B60R 22/30* (2013.01); *A44B 11/125* (2013.01)

(58) Field of Classification Search
CPC ............ Y10T 24/4084; Y10T 24/4086; Y10T 24/4072; Y10T 24/4016; Y10T 24/4077; A44B 11/12; B60R 22/30
See application file for complete search history.

(56) References Cited

U.S. PATENT DOCUMENTS

| | | | |
|---|---|---|---|
| 3,413,691 A * | 12/1968 | Elsner | A44B 11/14 24/134 R |
| 4,679,852 A | 7/1987 | Anthony et al. | |
| 4,726,625 A * | 2/1988 | Bougher | B60R 22/19 297/483 |
| 5,371,926 A | 12/1994 | Van Noy et al. | |
| 6,665,913 B2 * | 12/2003 | Kosh | A44B 11/12 24/191 |
| 8,464,402 B2 | 6/2013 | Mamie | |
| 8,763,211 B1 * | 7/2014 | Yu | B60P 7/0823 24/69 ST |

(Continued)

FOREIGN PATENT DOCUMENTS

FR 1300025 A 7/1962

OTHER PUBLICATIONS

Extended Search Report for copending Europeans Application No. 23215953.3, mailed May 27, 2024.

*Primary Examiner* — Robert Sandy
*Assistant Examiner* — Michael S Lee
(74) *Attorney, Agent, or Firm* — Barnes & Thornburg LLP

(57) ABSTRACT

A web length adjuster may include a frame having a base and spaced-apart sidewalls each extending away from the base, a reaction bar mounted to and between the sidewalls and defining a first web clamping surface extending at least partially along a length of the reaction bar between the sidewalls of the frame, and a handle assembly rotatably mounted to and between the sidewalls and defining a second web clamping surface extending at least partially along a length of the handle assembly between the sidewalls of the frame, the handle assembly rotatable relative to the frame between a first position to clamp a web of a vehicle occupant restraint web between the first and second clamping surfaces and a second position to allow the web to pass between the first and second clamping surfaces. The first and second clamping surfaces may define opposite curvatures in transverse cross-section.

16 Claims, 12 Drawing Sheets

(56) References Cited

U.S. PATENT DOCUMENTS

| | | | |
|---|---|---|---|
| 10,576,926 B2* | 3/2020 | Liu | B60R 22/30 |
| 2003/0019080 A1* | 1/2003 | Anthony | A44B 11/14 |
| | | | 24/68 R |
| 2003/0041420 A1* | 3/2003 | Kosh | A44B 11/12 |
| | | | 24/193 |
| 2006/0226694 A1* | 10/2006 | Higuchi | B60R 22/4604 |
| | | | 297/483 |
| 2010/0218348 A1* | 9/2010 | Mamie | B60P 7/0823 |
| | | | 24/68 A |
| 2011/0247179 A1* | 10/2011 | Bellamy | A61B 17/1327 |
| | | | 24/19 |
| 2012/0054989 A1* | 3/2012 | Eisinger | B60R 22/30 |
| | | | 24/168 |
| 2013/0106160 A1* | 5/2013 | Wang | B65D 63/16 |
| | | | 297/354.12 |
| 2013/0185902 A1* | 7/2013 | Kaneko | A44B 11/12 |
| | | | 24/324 |
| 2016/0166013 A1* | 6/2016 | Szewczyk | A44B 11/125 |
| | | | 24/69 SB |
| 2020/0214399 A1 | 7/2020 | Morgan | |

* cited by examiner

WEB LENGTH ADJUSTER

FIELD OF THE INVENTION

The present disclosure relates generally to restraint systems for occupant seats in motor vehicles, and more specifically to such restraint systems including one or more manually actuated web length adjusters for adjusting the length(s) of one or more webs of the restraint system.

BACKGROUND

Motor vehicle occupant restraint systems typically include a multi-point restraint harness, made up of one or more restraint webs, coupled to at least one occupant seat mounted in the motor vehicle. Some such occupant restraint systems may further include one or more manually activated devices for adjusting the length(s) of one or more of the restraint webs of the motor vehicle occupant restraint system.

SUMMARY

The present invention may comprise one or more of the features recited in the attached claims, and/or one or more of the following features and combinations thereof. In a first aspect, a web length adjuster may comprise a frame having a base and spaced-apart sidewalls each extending away from a respective side of the base, a reaction bar mounted to and between the sidewalls, the reaction bar defining a first web clamping surface extending at least partially along a length of the reaction bar between the sidewalls of the frame, and a handle assembly rotatably mounted to and between the sidewalls, the handle assembly defining a second web clamping surface extending at least partially along a length of the handle assembly between the sidewalls of the frame, the handle assembly rotatable relative to the frame between a first position to clamp a web of a vehicle occupant restraint web between the first and second clamping surfaces and a second position to allow the web to pass between the first and second clamping surfaces, wherein one of the first and second clamping surfaces is concave in transverse cross-section and the other of the first and second clamping surfaces is convex in transverse cross-section.

A second aspect may include the features of the first aspect, and wherein the concave and convex surfaces each define respective curvatures matched to one another taking into account a thickness of the web.

A third aspect may include the features of the first aspect or the second aspect, and may further comprise a biasing member coupled to and between the handle assembly and the frame or the reaction bar, the biasing member biasing the handle assembly to the first position.

A fourth aspect may include the features of the third aspect, and wherein the handle assembly is configured to move, under force applied to the handle assembly greater than a biasing force of the biasing member, from the first position to the second position.

A fifth aspect may include the features of any of the first through fourth aspects, and wherein at least one of the first and second web-clamping surfaces is at least one of treated, machined, coated or fabricated to grip, or enhance gripping of, the web.

A sixth aspect may include the features of any of the first through fifth aspects, and wherein the second web-clamping surface defines a plurality of spaced-apart teeth or ribs each extending along the handle assembly transversely between the sidewalls of the frame.

A seventh aspect may include the features of any of the first through sixth aspects, and wherein the first web-clamping surface defines a plurality of spaced-apart teeth or ribs each extending along the reaction bar transversely between the sidewalls of the frame.

An eighth aspect may include the features of any of the first through seventh aspects, and wherein the sidewalls of the frame are elongated and each defines a slot, and wherein respective ends of the reaction bar extend into the sidewall slots such that the reaction bar is movable along the slots in a longitudinal direction of the elongated sidewalls, and wherein, with the handle assembly in the first position, the reaction bar is responsive to load applied to the web to move within the slots toward the handle assembly to force the first web-clamping surface against the second web-clamping surface with the web clamped therebetween.

In a ninth aspect, a web length adjuster may comprise a frame having a base and spaced-apart sidewalls each extending away from a respective side of the base, a reaction bar mounted to and between the sidewalls, the reaction bar defining a first web clamping surface extending at least partially along a length of the reaction bar between the sidewalls of the frame, and a handle assembly rotatably mounted to and between the sidewalls, the handle assembly defining a second web clamping surface extending at least partially along a length of the handle assembly between the sidewalls of the frame, the handle assembly rotatable relative to the frame between a first position to clamp a web of a vehicle occupant restraint web between the first and second clamping surfaces and a second position to allow the web to pass between the first and second clamping surfaces, wherein the first and second clamping surfaces define opposite curvatures in transverse cross-section.

A tenth aspect may include the features of the ninth aspect, and wherein the first clamping surface defines a first curvature, and the second clamping surface defines a second curvature, the first curvature matched with the second curvature taking into account a thickness of the web.

An eleventh aspect may include the features of the tenth aspect, and wherein the first curvature defines a one of a concave surface and a convex surface, and the second curvature defines the other of a concave surface and a convex surface.

A twelfth aspect may include the features of any of the ninth through eleventh aspects, and wherein at least one of the first and second web-clamping surfaces is at least one of treated, machined, coated or fabricated to grip, or enhance gripping of, the web.

A thirteenth aspect may include the features of any of the ninth through twelfth aspects, and wherein at least one of the first web-clamping surface and the second web-clamping surface defines a plurality of spaced-apart teeth or ribs each extending transversely between the sidewalls of the frame.

A fourteenth aspect may include the features of any of the ninth through thirteenth aspects, and may further comprise a biasing member coupled to and between the handle assembly and the frame or the reaction bar, the biasing member biasing the handle assembly to the first position, and wherein the handle assembly is configured to move, under force applied to the handle assembly greater than a biasing force of the biasing member, from the first position to the second position.

In a fifteenth aspect, a web length adjuster may comprise a frame having a base and spaced-apart, elongated sidewalls each extending away from a respective side of the base, the elongated sidewalls each defining a slot, a reaction bar mounted to and between the sidewalls with respective ends of the reaction bar extending into the sidewall slots such that the reaction bar is movable along the slots in a longitudinal direction of the elongated sidewalls, the reaction bar defining a first web clamping surface between the sidewalls of the frame, and a handle assembly rotatably mounted to and between the sidewalls, the handle assembly defining a second web clamping surface extending between the sidewalls of the frame and configured complementarily to the first web clamping surface, the handle assembly rotatable relative to the frame between a first position to clamp a web of a vehicle occupant restraint web between the first and second clamping surfaces and a second position to allow the web to pass between the first and second clamping surfaces, wherein, with the handle assembly in the first position, the reaction bar is responsive to load applied to the web to move within the slots toward the handle assembly to force the first web-clamping surface against the second web-clamping surface with the web clamped therebetween.

A sixteenth aspect may include the features of the fifteenth aspect, and wherein the first and second clamping surfaces define opposite curvatures in transverse cross-section.

A seventeenth aspect may include the features of the fifteenth or sixteenth aspects, and wherein the first clamping surface defines a first curvature, and the second clamping surface defines a second curvature, the first curvature matched with the second curvature taking into account a thickness of the web.

An eighteenth aspect may include the features of any of the fifteenth through seventeenth aspects, and wherein one of the first and second clamping surfaces is concave in transverse cross-section and the other of the first and second clamping surfaces is convex in transverse cross-section.

A nineteenth aspect may include the features of any of the fifteenth through eighteenth aspects, and wherein at least one of the first and second web-clamping surfaces is at least one of treated, machined, coated or fabricated to grip, or enhance gripping of, the web.

A twentieth aspect may include the features of any of the fifteenth through nineteenth aspects, and may further comprise a biasing member coupled to and between the handle assembly and the frame or the reaction bar, the biasing member biasing the handle assembly to the first position, and wherein the handle assembly is configured to move, under force applied to the handle assembly greater than a biasing force of the biasing member, from the first position to the second position.

DETAILED DESCRIPTION OF THE DRAWINGS

Figure 1:
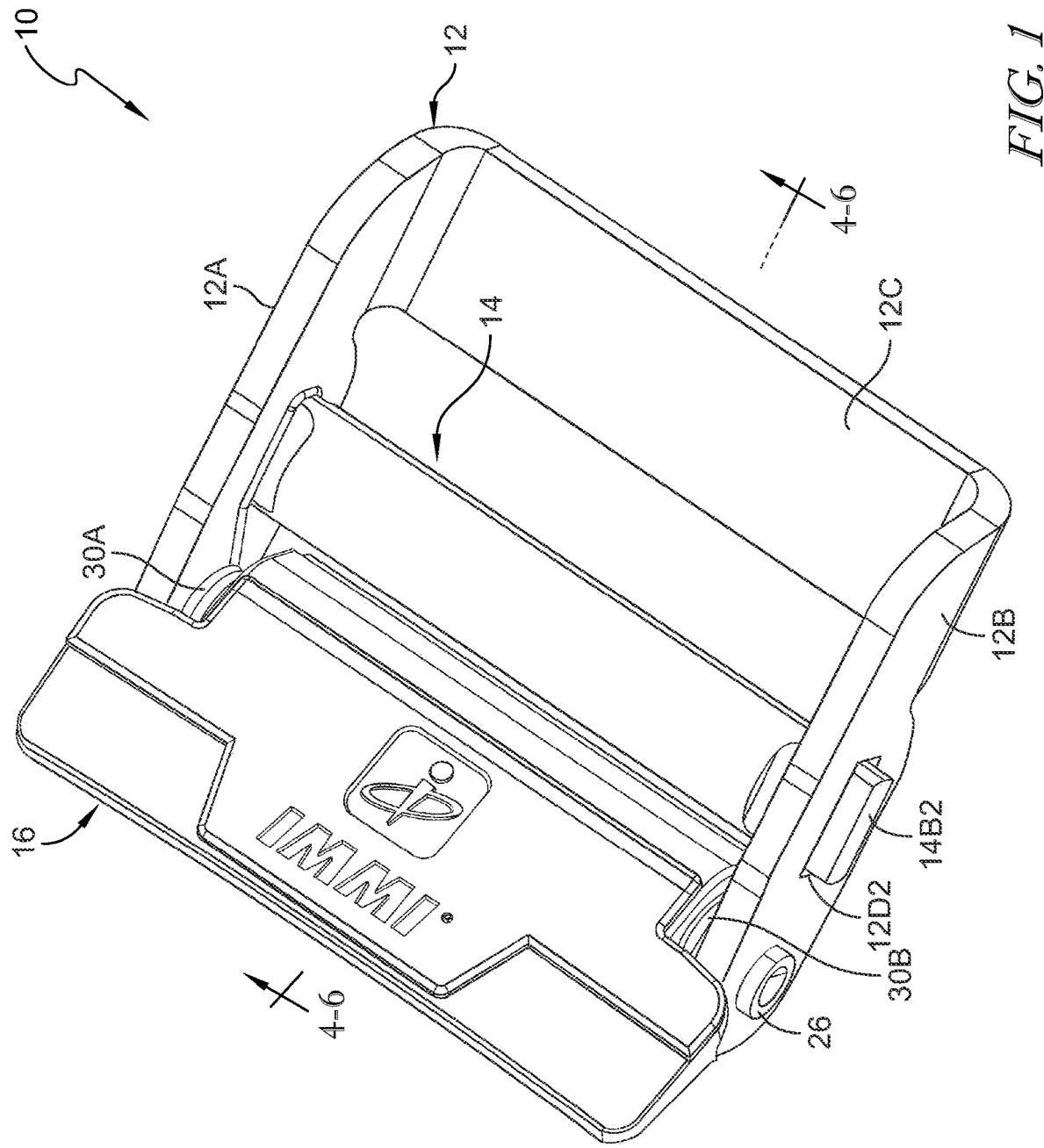
FIG. 1 is a front perspective view of an embodiment of a manually actuated web length adjuster.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

Referring now to FIGS. 1-6, an embodiment is shown of a manually activated web length adjuster 10 configured to adjust a length of a restraint web 50 of a multi-point restraint harness operatively coupled to an occupant seat of a motor vehicle. Although not shown in the attached drawings, the multi-point restraint harness may be configured to have any number of restraint webs with any number of points of restraint greater than two. Examples of conventional multi-point restraint harnesses with which the web length adjuster 10 may be used include, but are not limited to, 2-point "lap web" restraint harnesses, 3-point restraint harnesses including a lap web or lap web portion and a single shoulder web or shoulder web portion, 4-point restraint harnesses including two shoulder webs or shoulder web portions and two lap webs or lap web portions, 6-point restraint harnesses including two shoulder webs or shoulder web portions, two lap webs or lap web portions and two thigh webs thigh web portions. Any number of the manually actuated web length adjusters illustrated in the attached drawings and described herein may be used with any such multi-point restraint harness to adjust the length(s) of any number of restraint webs thereof. In any such application of the web length adjuster(s) illustrated in the attached drawings and described herein, one end of the web 50 passed through the web length adjuster will typically be attached or otherwise secured, either directly or by way of another web, web retractor or the like, to the occupant seat and/or to the motor vehicle in which the occupant seat is mounted, and an opposite end of the web will be free, i.e., unattached. In this regard, the web length adjuster is actuatable to manually adjust a length of the web relative to the attached or secured end of the web as described below.

The occupant seat to which any such multi-point restraint harness is, or is to be, operatively mounted may be any seat mounted within, or configured to be mounted within, a motor vehicle, wherein the motor vehicle may, for purposes of this disclosure, be any land, water or air-based vehicle powered, or configured to be powered, by an internal combustion engine, one or a plurality of purely electrically rechargeable power sources or a combination thereof, and/or may be or include any occupant transportation vehicle that is, or is configured to be, towed or pushed thereby. Examples of motor vehicles in which the occupant seat may be mounted include, but are not limited to, an emergency vehicle, such as a fire fighting or rescue vehicle, medical vehicle, security vehicle or the like, a light, medium or heavy-duty truck, an industrial vehicle, e.g., construction and/or mining equipment, farm equipment, excavation equipment and/or other heavy equipment, a lift truck, a recreational vehicle such as an all-terrain vehicle (ATV) or other off-road vehicle, an automobile, an electric vehicle, a utility vehicle (UTV), a commercial vehicle, a racing vehicle, a military vehicle, and the like.

Figure 2:
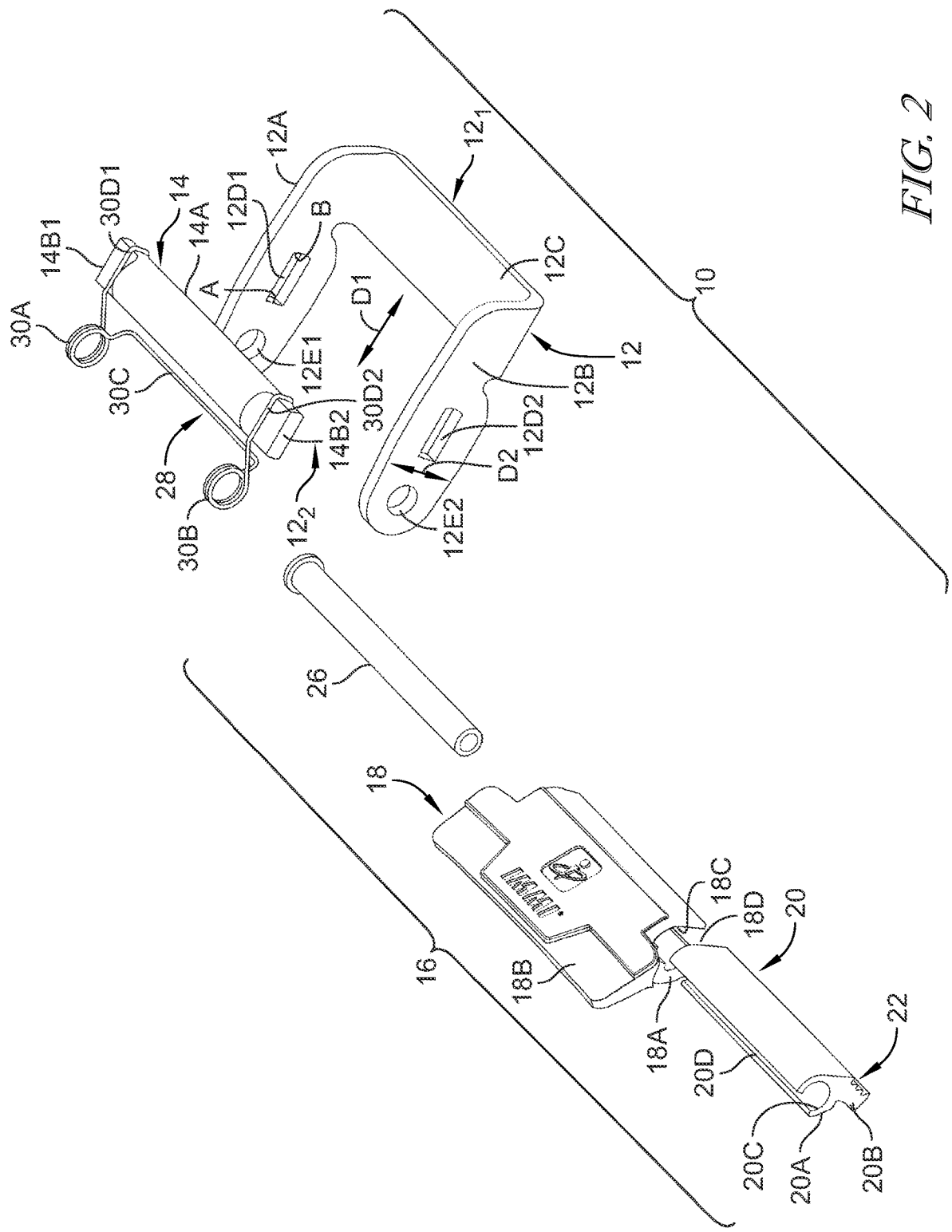
FIG. 2 is an exploded view of the web length adjuster of FIG. 1.
Figure 3:
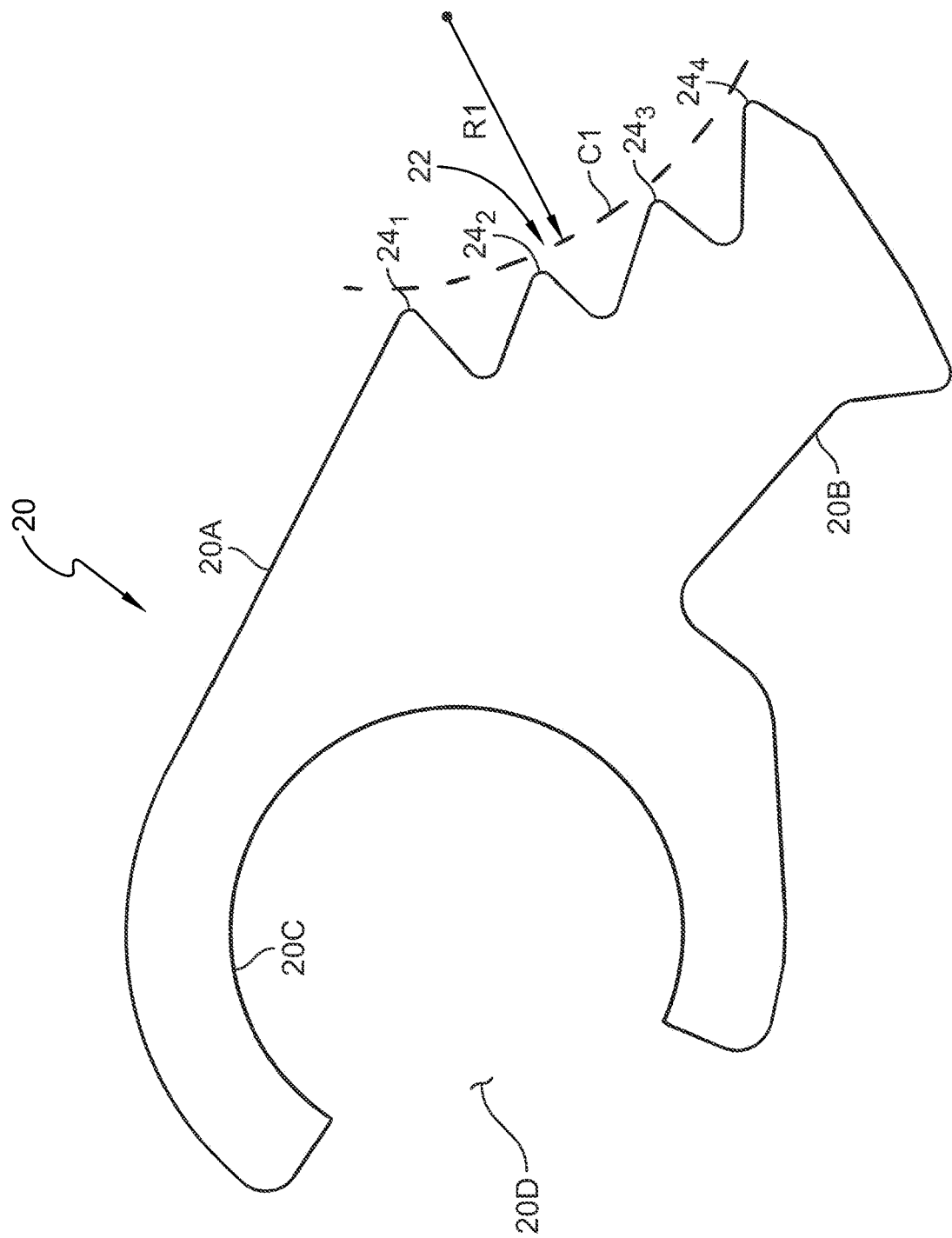
FIG. 3 is a magnified side view of the clamping member of the web clamping assembly illustrated in FIGS. 1 and 2.

Referring specifically to FIGS. 1 and 2, the web length adjuster 10 illustratively includes a frame 12 having spaced-apart, elongated sidewalls 12A, 12B. A base plate 12C extends transversely between, and is coupled to, bottom edges of the sidewalls 12A, 12B along one end 12₁ of the frame 12. The sidewalls 12A, 12B each illustratively define a respective slot 12D1, 12D2 therethrough, wherein the slots 12D1, 12D2 are each elongated in the axial direction D1 of the elongated sidewalls 12A, 12B. The sidewalls 12A, 12B further illustratively each define an opening 12E1, 12E2 therethrough adjacent to an opposite end 12₂ of the frame 12. In the illustrated arrangement, the slots 12D1, 12D2 are aligned with one another in the axial direction D1 and in the transverse direction D2 of the sidewalls 12A, 12B, the openings 12E1, 12E2 are likewise aligned with one another in the axial direction D1 and in the transverse direction D2 of the sidewalls 12A, 12B, and the slots 12D1, 12D2 are positioned along the respective sidewalls 12A, 12B between the openings 12E1, 12E2 and the base plate 12C, with the base plate 12C defined along the end 12₁ of the frame 12 and with the openings 12E1, 12E2 defined at or adjacent to the opposite end 12₂ of the frame 12. In the illustrated embodiment, the base plate 12C is clear of the slots 12D1, 12D2 such that no part of the base plate 12C extends below any portion of the slots 12D1, 12D2, although in alternate embodiments at least a portion of the base plate 12C may extend beneath at least a portion of the slots 12D1, 12D2.

A reaction bar 14 is illustratively provided in the form of an elongated body 14A with rectangularly-shaped ends 14B1, 14B2 defined at opposite ends of the body 14A. Either or both of the rectangularly-shaped ends 14B1 and 14B2 may be separate from the body 14A and attached to the body 14A during construction of the web length adjuster 10. The elongated body 14A is illustratively depicted as being cylindrical, e.g., so as to be circular or approximately circular in transverse cross-section, although in alternate embodiments the elongated body 14A may have any cross-sectional shape so long as the web clamping surface of the elongated body 14A which, along with the web clamping assembly 16, engages the web 50 therebetween (see FIGS. 5 and 6) to prevent excursion of the web 50 (i.e., to prevent movement of the web 50, relative to the web length adjuster 10, along the longitudinal direction of the web 50), is shaped complementarily to the web-clamping surface of the web clamping assembly 16, as will be described more fully below.

The rectangularly-shaped ends 14B1, 14B2 of the reaction bar 14 are illustratively sized complementarily to the slots 12D1, 12D2 defined through the sidewalls 12A, 12B of the frame 12, such that the ends 14B1, 14B2 are each configured to be received within a respective one of the slots 12D1, 12D2 to operatively mount the reaction bar 14 to the frame 12 with the reaction bar 14 extending transversely between the sidewalls 12A, 12B. Illustratively, the lengths and widths of the ends 14B1, 14B2 of the reaction bar 14 are selected to be less than the corresponding lengths of the slots 12D1, 12D2 in the axial direction D1 of the sidewalls 12A, 12B and the widths of the slots 12D1, 12D2 in the transverse direction D2 of the sidewalls 12A, 12B respectively, so as to allow the ends 14B1, 14B2 to be slidably received, and movable, within and relative to respective ones of the slots 12D1, 12D2 between opposite ends A, B of the slots 12D1, 12D2 while also retaining and maintaining the ends 14B1, 14B2 within the slots 12D1, 12D2 such that the body 14A of the reaction bar extends transversely between the sidewalls 12A, 12B of the frame 12 and is movable in the axial direction D1 of the sidewalls 12A, 12B between the ends A, B of the slots 12D1, 12D2. In alternate embodiments, either or both of the ends 14B1 and 14B2 of the reaction bar 14 and/or either or both of the slots 12D1 and 12D2 may be non-rectangular and may have any cross-sectional shape so long as the ends 14B1, 14B2 of the reaction bar 14, and thus the reaction bar 14, are movable relative to and along the slots 12D1, 12D2, in the longitudinal direction D1 of the frame sidewalls 12A, 12B, to and between the opposite ends A, B of the slots 12D1, 12D2. In still other alternate embodiments, the reaction bar 14 may be secured to the sidewalls 12A, 12B of the frame 12 such that the reaction bar 14 is not movable relative to and along the slots 12D1, 12D2 in the longitudinal direction D1 of the frame sidewalls 12D1, 12D2.

In the embodiment illustrated in FIGS. 1-6, the web clamping assembly 16 illustratively includes a clamping handle 18, a clamping member 20 configured to be mounted to the handle 18 and a pin or axle 26 configured to pivotably mount the clamping handle 18 and clamping member 20 to the frame 12 such that the clamping handle 18 and the clamping member 20 will be together rotatable about the pin or axle 26 relative to the frame 12. The clamping handle 18 illustratively includes an elongated clamping handle body 18A and a handle grip 18B extending away from the handle body 18A at least partially along the length of the handle body 18A. Upon mounting of the clamping handle 18 to the frame 12, the handle grip 18B will extend generally away from the end 12₂ of the frame 12 as illustrated by example in FIGS. 1, 3 and 5-6. The clamping member 20 likewise includes an elongated body 20A and a web engagement body 20B extending away from the clamping member body 20A at least partially along the length of the clamping member body 20A. The web engagement body 20B illustratively defines a web-clamping surface 22 configured to clamp the web 50 against a web-clamping surface of the elongated body 14A of the reaction bar 14 to prevent excursion of the web 50. The web-clamping surface 22, with the clamping handle 18 pivotably mounted to the frame 12, illustratively extends transversely between the sidewalls 12A, 12B of the frame 12 so as to extend substantially parallel with the reaction bar 14. The web-clamping surface of the body 14A of the reaction bar 14 and the web-clamping surface 22 of the clamping member 20 may extend fully between the sidewalls 12A, 12B of the frame 12 as illustrated by example in FIGS. 1-6, or may instead extend only partially between the sidewalls 12A, 12B of the frame 12.

The web-clamping surface 22 of the clamping member 20 is illustratively configured to grip or to enhance gripping of the web 50, and in the embodiment illustrated in FIGS. 1-6 the web-clamping surface 22 defines a plurality of spaced-apart teeth, each of which illustratively extend along the length of the web-clamping surface 22, i.e., such that the teeth extend transversely between the sidewalls 12A, 12B of the frame 12 and run parallel with the body 14A of the reaction bar 14. In the illustrated embodiment, the web-clamping surface 22 defines four such spaced-apart teeth 24₁-24₄ each extending continuously along the length of the web-clamping surface 22 of the clamping member 20. In some alternate embodiments, one or more of the teeth 24₁-24₄ may not be continuous and may instead be provided in the form of a series of space-apart teeth extending at least partially along the length of the web-clamping surface 22. In some alternate embodiments, the web-clamping surface 22 may define more or fewer than four such teeth 24₁-24₄. In other alternate embodiments, one or more (or all) of the teeth 24₁-24₄ may be omitted, and the web-clamping surface 22 may be treated, machined, processed, coated, fabricated, chemically, electrically and/or mechanically altered or otherwise configured in any random or defined pattern so as to grip or enhance gripping of the web 50. In the embodiment illustrated in FIGS. 1-6, the web-clamping surface of the outer surface of the body 14A of the reaction bar 14 against which the web-clamping surface 22 clamps the web 50 is depicted as a generally smooth surface. In alternate embodiments, the web-clamping portion of the outer surface of the body 14A, or the entirety of the outer surface of the body 14A, may define a plurality of teeth similar to the teeth 24₁-24₄ and/or may be treated, machined, processed, coated, fabricated, chemically, electrically and/or mechanically altered or otherwise configured in any random or defined pattern so as to grip or enhance gripping of the web 50.

The handle body 18A of the clamping handle 18 defines a channel 18C longitudinally therethrough, and the body 20A of the clamping member 20 likewise defines a channel 20C longitudinally therethrough. The channel 18C is illustratively keyed to the shape of the outer surface of the body 20A of the clamping member 20 to allow the body 20A of the clamping member 20 to be axially received within the channel 18C and, upon receipt, to prevent rotational movement of the clamping member 20 relative to the channel 18C and thus relative to the handle body 18A. In the illustrated embodiment, the channel 18C is an open channel with an opening 18D running the length of the channel 18C such that the body 20A of the clamping member 20 can be axially inserted into the channel 18C with the web engagement body 20B extending outwardly through and away from the channel 18C via the opening 18D. The channel 20C is also illustratively open channel with an opening 20D running the length of the channel 20C such that, with the body 20A of the clamping member 20 axially inserted into the channel 18C of the clamping handle 18, the channel 20C and a portion of the inner wall of the channel 18C opposite the opening 20D together form a bore 21 (see FIGS. 4-6) through which the pin or axle 26 will axially extend to pivotably (or rotatably) mount the handle assembly 16 to and between the sidewalls 12A, 12B of the frame 12.

With the body 20A of the clamping member 20 received within the channel 18C of the handle body 18A, the combination of the handle body 18A and the clamping member 20 is positioned between the sidewalls 12A, 12B of the frame 12 such that the bore 21 defined by the combined channels 18C, 20C aligns with the openings 12E1, 12E2 defined through the sidewalls 12A, 12B respectively. The pin or axle 26 is then passed through the openings 12E1, 12E2 and the bore 21 to pivotably (or rotatably) mount the combination of the clamping handle 18 and the clamping member 20 to and between the sidewalls 12A, 12B of the frame 12. The combination of the clamping handle 18 and the clamping member 20 rotate together about the pin or axle 26 relative to the sidewalls 12A, 12B of the frame 12.

The web length adjuster 10 illustratively includes a biasing member 28 operatively coupled to and between the web clamping assembly 16 and the reaction bar 14, and is configured to normally bias the web clamping assembly 16 to an unactuated position relative to the frame 12 in which a web 50 is trapped between the web-clamping surface 22 of the clamping member 20 and the web-clamping surface, i.e., the web-clamping portion of the outer surface of, the reaction bar 14. By applying an appropriately oriented force to the handle grip 18B of the clamping handle 18 that is greater than the biasing force of the biasing member 28, the web clamping assembly 16 can be manually actuated to an actuated position relative to the frame 12 in which the web-clamping surface 22 of the clamping member 20 is drawn away from the reaction bar 14 to allow the web 50 to pass therebetween for purposes of adjusting the length the web 50. The actuated position of the web clamping assembly 16 is illustratively depicted by example in FIG. 4, and the unactuated position of the web clamping assembly 16 is illustratively depicted by example in FIGS. 5 and 6.

In the illustrated embodiment, the biasing member 28 is an elongated structure including two spaced-apart coiled sections 30A, 30B, an elongated linear member 30C extending between the coiled sections 30A, 30B, an attachment leg 30D1 coupled to and extending from the coiled section 30A and another attachment leg 30D2 coupled to and extending from the coiled section 30B. The coiled sections 30A, 30B are illustratively sized to receive the pin or axle 26 therethrough, and the linear member 30C is illustratively sized and configured to engage the web clamping assembly 16, e.g., between the web-clamping surface 22 of the body 20B of the clamping member 20 and the portion of the body 18A of the clamping handle 18 which defines one terminal end of the open channel 18C as illustrated by example in FIGS. 4 and 5. The mounting leg 30D1 is illustratively sized and configured to be coupled to the rectangularly-shaped end 14B1 of the reaction bar 14, and the mounting leg 30D2 is illustratively sized and configured to be coupled to the rectangularly-shaped end 14B2 of the reaction bar 14. With the biasing member 28 coupled to and between the web clamping assembly 16 and the ends 14B1, 14B2 of the reaction bar 14 as just described, the coiled sections 30A, 30B act to bias the handle assembly 16 to the unactuated position described above and illustrated by example in FIG. 4. In some alternate embodiments, the biasing member 28 may instead be configured to be coupled to and between only the clamping handle 18 and the reaction bar 14, between only the clamping member 20 and the reaction bar 14, or between either or both of the clamping handle and the clamping member 20 and the sidewalls 12A, 12C of the frame 12. Alternatively still, the biasing member 28 may, in any embodiment, include two or more biasing members.

Figure 4:
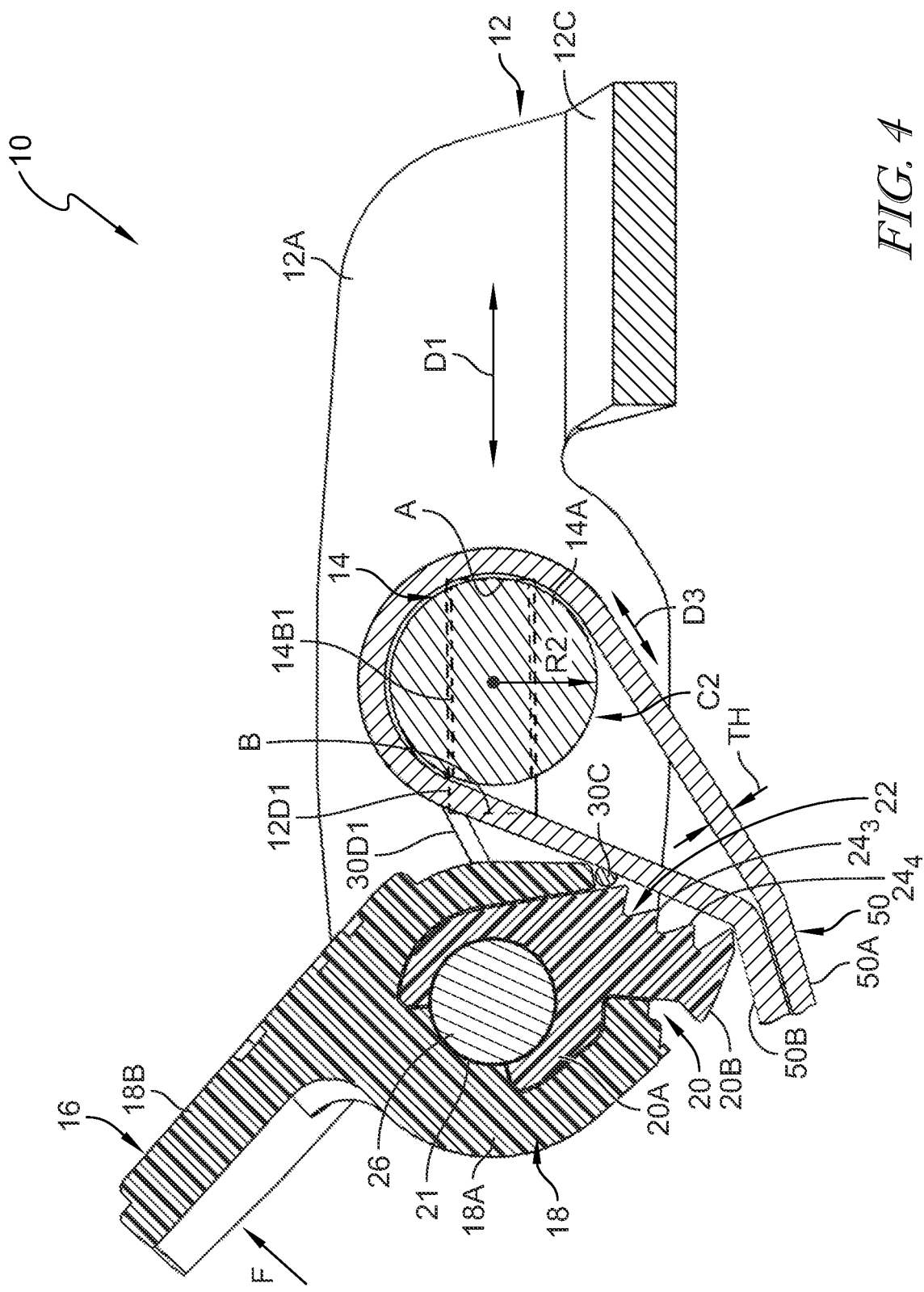
FIG. 4 is a cross-sectional view of the web length adjuster of FIG. 1 as viewed along section lines 4-6-4-6, shown with a restraint web operatively coupled thereto and shown in an actuated state to allow for adjustment of a length of the restraint web.
Figure 5:
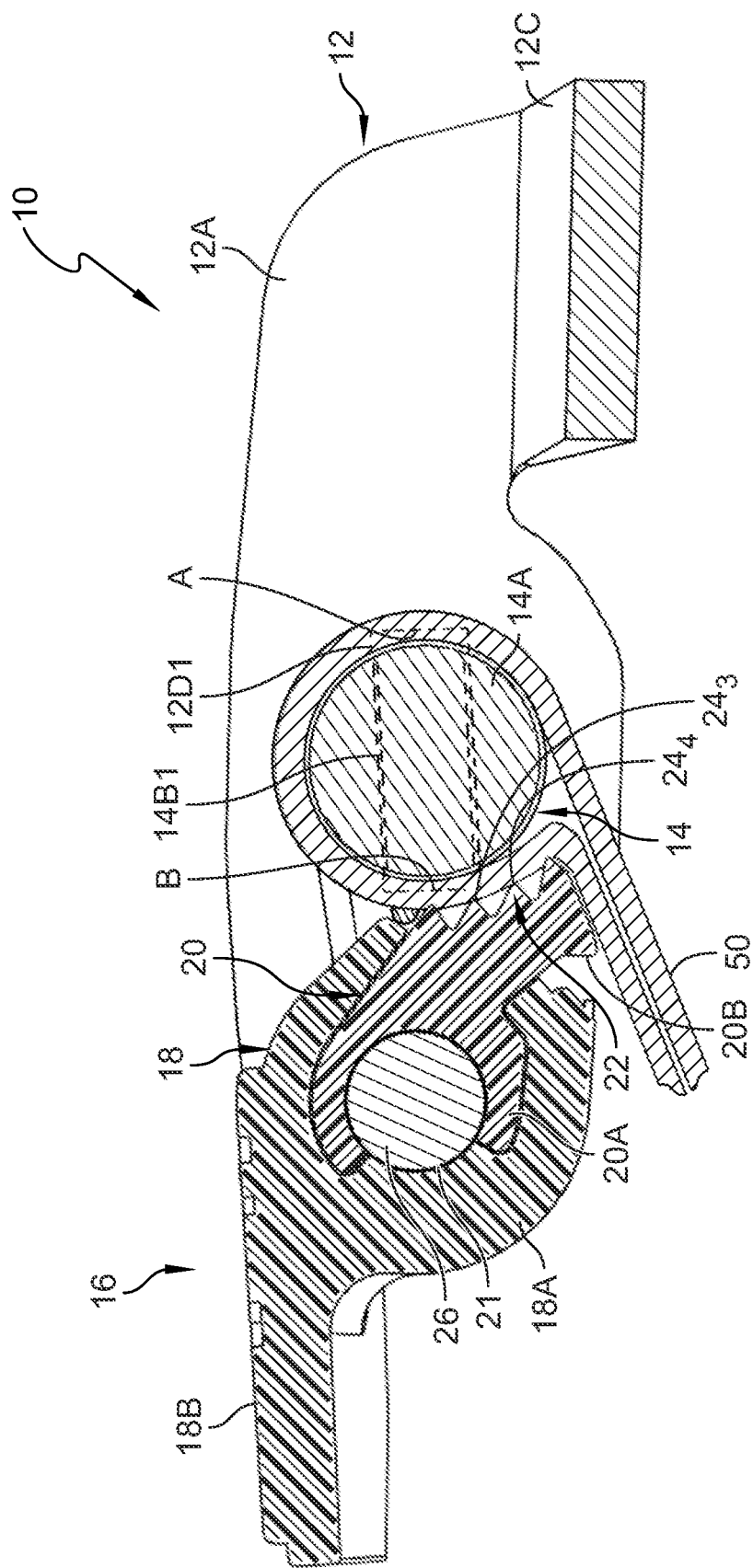
FIG. 5 is a cross-sectional view similar to FIG. 4 with the web length adjuster shown in an unactuated state to clamp the restraint web thereto under conditions in which no external load is applied to the web.
Figure 6:
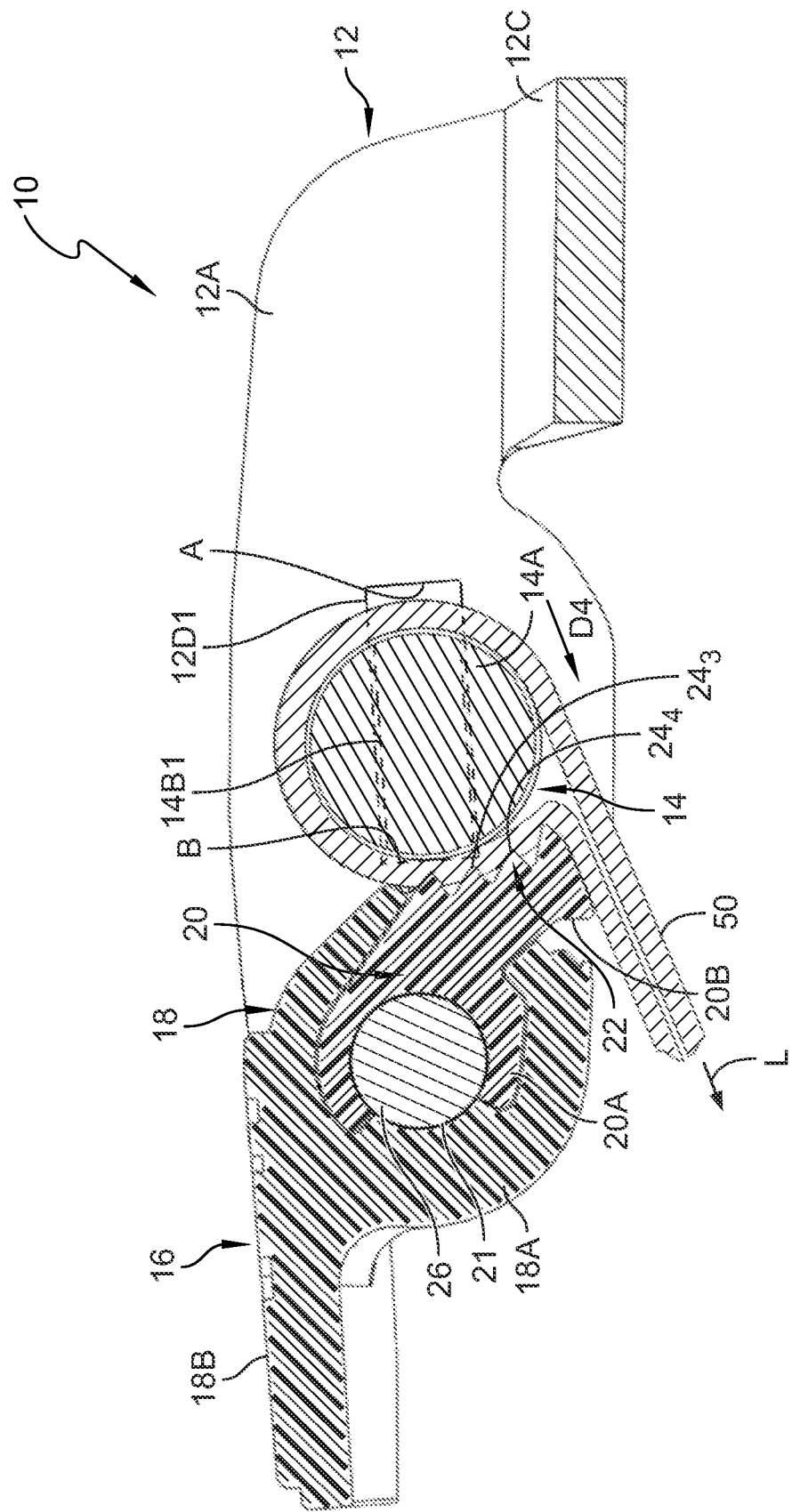
FIG. 6 is a cross-sectional view similar to FIG. 5 with the web length adjuster shown in an unactuated state to clamp the restraint web thereto under conditions in which an external load is applied to the web.

The web-clamping surface 22 of the clamping member 20 and the web-clamping surface of the reaction bar 14, i.e., the portion of the outer surface of the body 14A of the reaction bar 14 against which the web-clamping surface 22 clamps the web 50 with the handle assembly 16 in the unactuated position, as illustrated by example in FIGS. 5 and 6, are illustratively shaped complementarily to one another in a manner configured to grip or to enhance gripping of the web 50 therebetween. As illustrated by example in FIG. 3, the teeth 241-244 defined by the web-clamping surface 22 are arranged so as to define a concave curvature C1 defined by and sequentially along the teeth 241-244, such that the web-clamping surface is concave in cross-section, and as illustrated by example in FIG. 4 the outer surface of the body 14A of the reaction bar 14 defines a convex curvature C2 about its periphery, such that at least the web-clamping surface of the body 14A of the reaction bar 14 is convex in cross-section. In the illustrated embodiment, the curvature C1 is at least approximately circular so as to define a radius of curvature R1, and the curvature C2 is likewise illustratively at least approximately circular so as to define a radius of curvature R2.

The radii of curvature R1 and R2, are illustratively configured to be matched to one another taking into account the thickness TH of the web 50 (see FIG. 4). In other words, the radii of curvature R1 and R2 are not equal, but rather R1 is illustratively greater than R2 by approximately the thickness TH of the web 50. This arrangement illustratively ensures that, with the handle assembly in the unactuated position (FIGS. 5 and 6), all of the teeth 241-244 defined by the web-clamping surface 22 of the clamping member 20 about the concave web-clamping surface 22 will engage the web 50 and force the engaged portion of the web 50 onto all of the respective convex web-clamping surface of the body 14A of the reaction bar 14, such that all of the teeth 241-244 will bear against all of the respective web-clamping surface of the body 14A of the reaction bar 14 with the web 50 clamped therebetween. In alternate embodiments, the curvature C1 may not be circular and/or at least the portion of the outer surface of the body 14A of the reaction bar 14 that defines the web-clamping surface thereof, i.e., the surface against which the web-clamping surface 22 clamps the web 50 with the handle assembly 16 in the unactuated position, many not be circular, although in any case the curvatures C1 and C2 will each be configured in a manner which ensures that, with the handle assembly 16 in the unactuated position (FIGS. 5 and 6), most or all of the teeth 241-244, or other web clamping surface, defined by the web-clamping surface 22 of the clamping member 20 will bear against most or all the respective web-clamping surface of the body 14A of the reaction bar 14 with the web 50 clamped therebetween. It will be understood that, in some alternate embodiments, the web-clamping surface 22 of the clamping member 20 may define the convex curvature, and at least the respective portion of the outer surface of the body 14A of the reaction bar 14 which defines the web-clamping surface of the body 14A may define the concave curvature matched to the convex curvature of the web-clamping surface 22 as described above so as to grip or enhance gripping of the web 50 therebetween as described above.

In embodiments which include it, the "floating" mounting arrangement of the reaction bar 14 to and between the slots 12D1, 12D2 of the respective sidewalls 12A, 12B of the frame 12, as described above, illustratively serves to enhance both length adjustment of the web 50, in the actuated position of the handle assembly 16, and gripping of the web 50 between the handle assembly 16 and the reaction bar 14, in the unactuated position of the handle assembly 16. The former case is illustrated by example in FIG. 4 which shows the handle assembly 16 manually actuated to the actuated position thereof by application of a force F applied to the handle grip 18B generally in the direction shown. With the force F greater than the biasing force of the biasing member 28, the handle assembly 16 rotates about the pin or axle 26 relative to the sidewalls 12A, 12B of the frame 16 so as to draw the clamping surface 22 of the clamping member 20 away from the body 14A of the reaction bar 14. Doing so causes the body 18A of the clamping handle 18 to act against the web 50 to nudge the reaction bar 14 in the axial direction D1 of the elongated sidewalls 12A, 12B until the ends 14B1, 14B2 of the reaction bar 14 reach the ends A of the slots 12D1, 12D2, as depicted in FIG. 4. This maximizes the distance between the handle assembly 16 and the reaction bar 14, and thus more freely and easily allows either portion 50A, 50B of the web 50 to be manually drawn in the direction D3 to adjust the length of the web 50 than if the ends 14B1, 14B2 of the reaction bar 14, and thus the reaction bar 14 itself, were displaced away from the ends A of the slots 12D1, 12D2 towards the handle assembly 16.

As depicted by example in FIG. 5, no external load is applied to the web 50 and the handle assembly 16 is in the unactuated position in which the biasing member 28 acting between the handle assembly 16 and the reaction bar 14 (or frame 12) forces the web-clamping surface 22 of the clamping member 20 toward and into engagement with web-clamping surface of the body 14A of the reaction bar 14 to clamp the web 50 therebetween. The biasing force of the biasing member 28, along with the dimensions, configurations and relative positions of the handle assembly 16 and the reaction bar 14, are selected so as to apply a clamping force to the web 50 which prevents excursion of the unloaded web 50 relative to the web length adjuster 10. With no external load applied to the web 50, the biasing force applied by the biasing member 28 through the handle assembly 16 illustratively positions the ends 14B1, 14B2 of the reaction bar 14 between the opposed ends A, B of the slots 12D1, 12D2 defined through the sidewalls 12A, 12B of the frame 12, as illustrated by example in FIG. 5.

With the handle assembly 16 in the unactuated position so as to clamp the web 50 between the web-clamping surface 22 of the clamping member 20 and the web-clamping surface of the body 14A of the reaction bar 14, as illustrated by example in FIG. 5, an external load may, at some point be applied to the web 50 by a seat occupant being restrained by a restraint harness of which web 50 is part, e.g., by voluntary movement of the occupant, and/or by involuntary movement of the occupant resulting from normal operating conditions of the motor vehicle and/or resulting from an impact, rollover or other motor vehicle event, or the like.

Such an external load, L, acting on the web 50 is depicted by example in FIG. 6, and this load L is transferred through the web 50 to act on the reaction bar 14 in the direction D4. The force of this load L acting on the reaction bar 14 in the direction D4 causes the ends 14B1, 14B2 of the reaction bar 14 to move within and relative to the slots 12D1, 12D2 toward, and with a load L of sufficient force, to the ends B of the slots 12D1, 12D2 as depicted by example in FIG. 6. With the handle assembly 16 in the unactuated position, such movement of the reaction bar 14 in response to application of the external load L to the web 50 forces the web-clamping surface of the body 14A of the reaction bar 14 further toward the web-clamping surface 22 of the clamping member 20, thereby strengthening the holding force and grip on the web 50 by the combination of the handle assembly 16 and reaction bar 14 to ensure prevention of any excursion of the web 50 relative to the web length adjuster 10 under the load L on the web 50. In embodiments in which the web-clamping surface 22 of the clamping member 20 and/or the respective web-clamping surface of the body 14A of the reaction bar 14 include(s) one or more grip-enhancing structures, such grip enhancing structures will be forced during such loading of the web 50 into or against, or further into or against, the web 50 to further enhance gripping of the web 50. This feature is depicted by example in FIG. 6 with the teeth 241-244 shown forced at least partially into the web 50.

Figure 7:
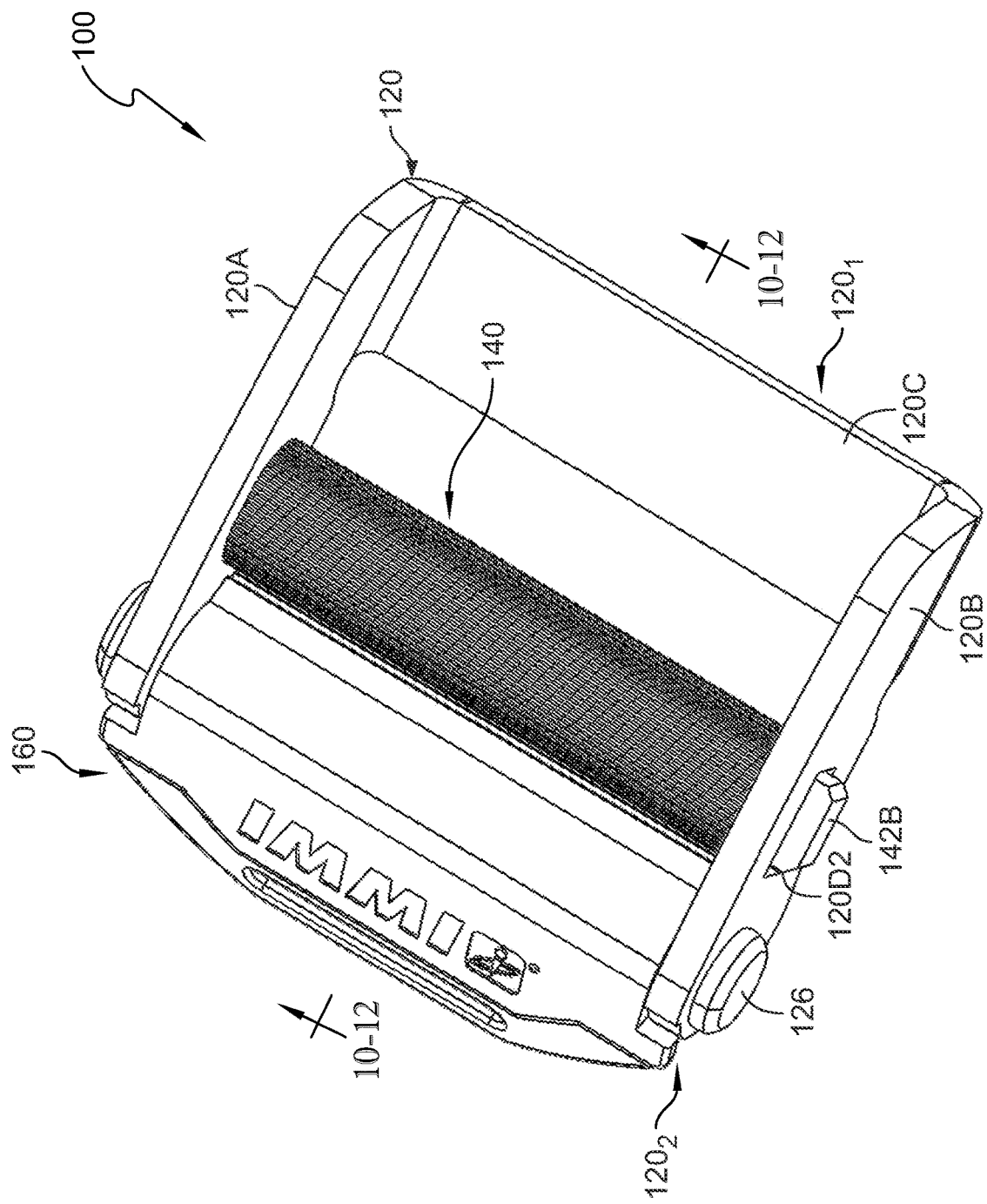
FIG. 7 is a front perspective view of another embodiment of a manually actuated web length adjuster.
Figure 8:
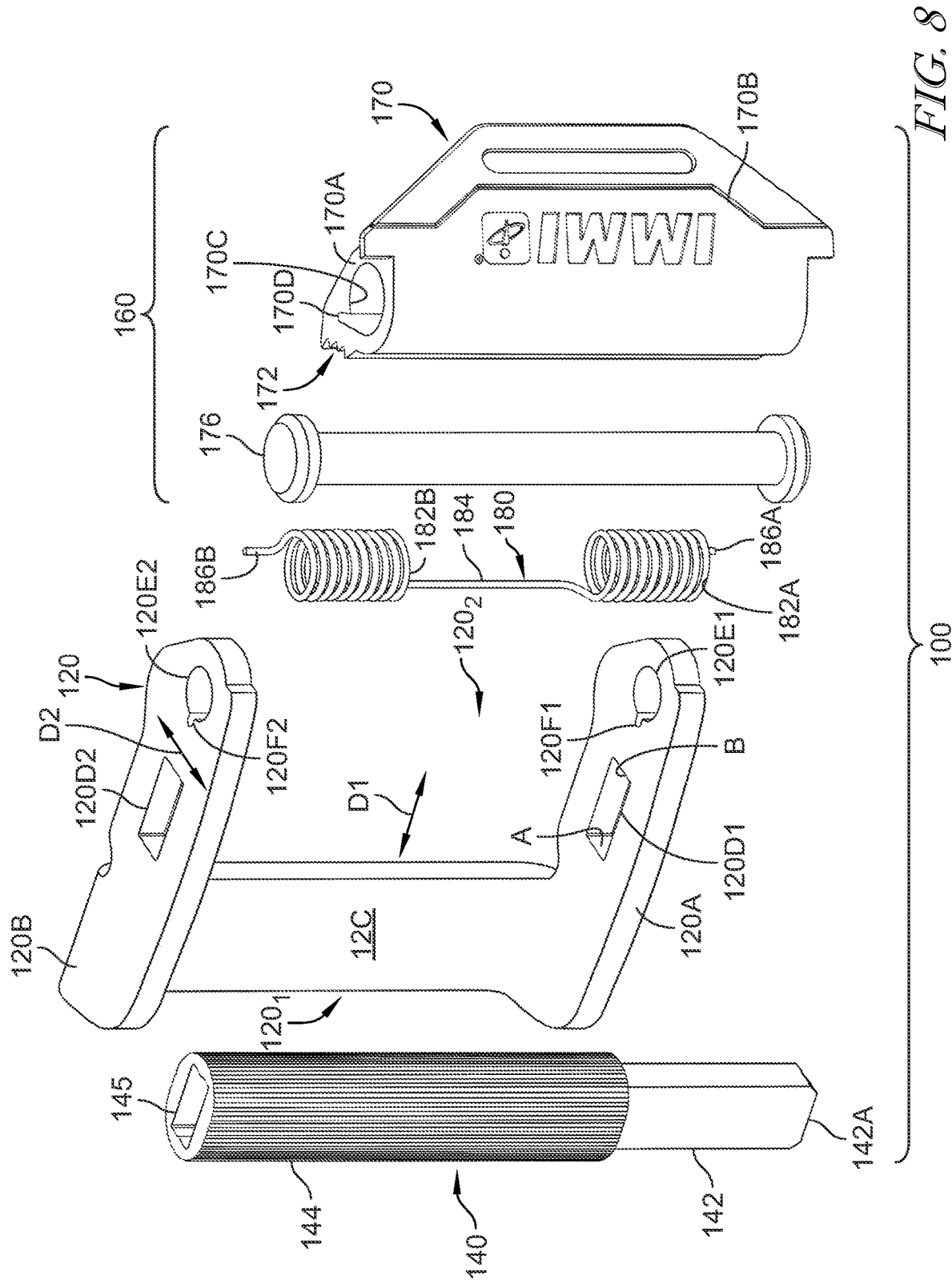
FIG. 8 is an exploded view of the web length adjuster of FIG. 7.
Figure 9:
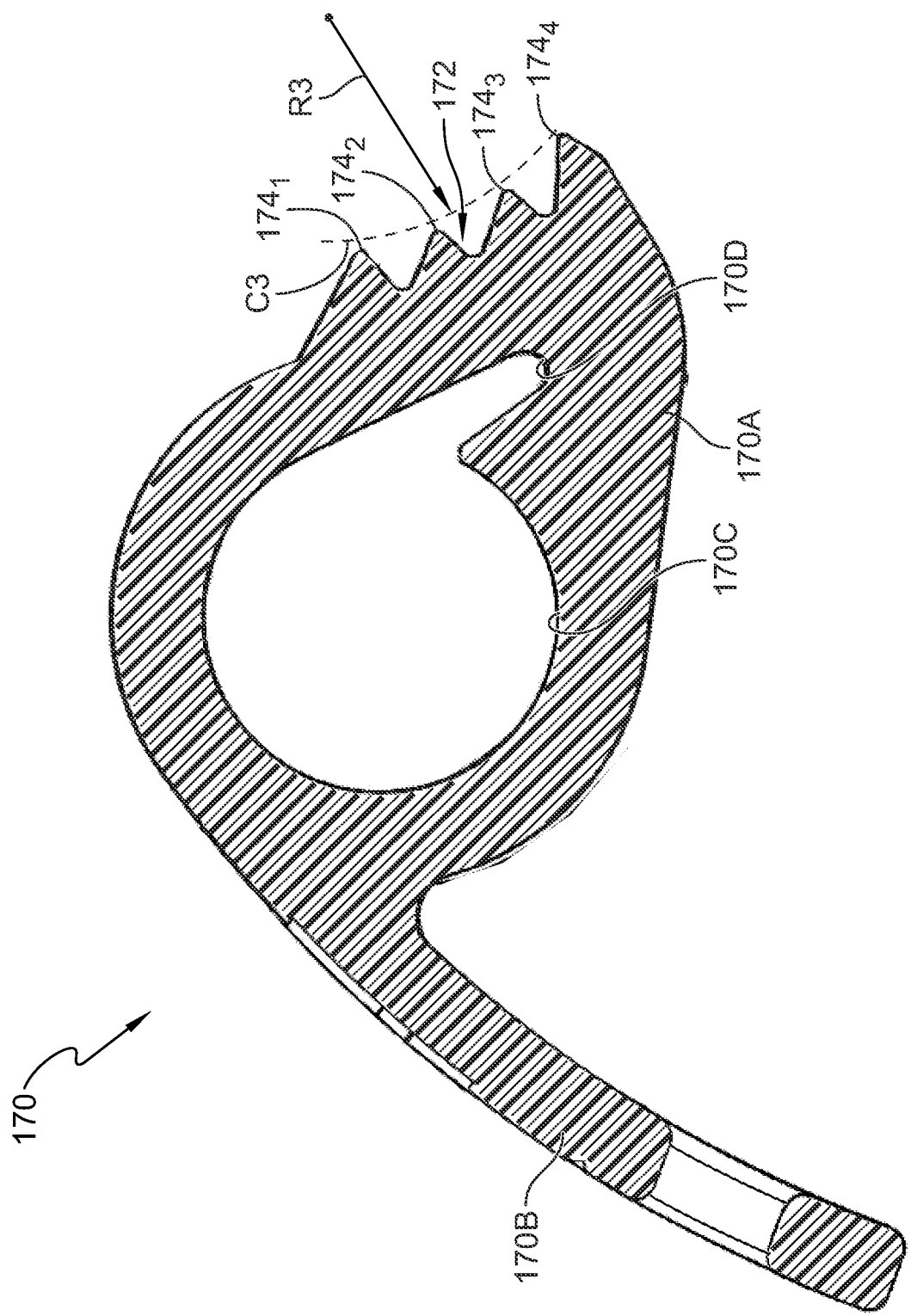
FIG. 9 is a magnified cross-sectional view of the clamping handle alone of the web clamping assembly illustrated in FIGS. 7 and 8, as viewed along section lines 10-12-10-12 of FIG. 7.

Referring now to FIGS. 7-12, another embodiment is shown of a manually activated web length adjuster 100 configured to adjust a length of a restraint web 50 of a multi-point restraint harness operatively coupled to an occupant seat of a motor vehicle. Referring specifically to FIGS. 7 and 8, the web length adjuster 100 illustratively includes a frame 120 having spaced-apart, elongated sidewalls 120A, 120B. A base plate 120C extends transversely between, and is coupled to, bottom edges of the sidewalls 120A, 120B along one end 120₁ of the frame 120. The sidewalls 120A, 120B each illustratively define a respective slot 120D1, 120D2 therethrough, wherein the slots 120D1, 120D2 are each elongated in the axial direction D1 of the elongated sidewalls 120A, 120B. The sidewalls 120A, 120B further illustratively each define an opening 12E1, 12E2 therethrough adjacent to an opposite end 1202 of the frame 120, and a channel 120F1, 120F2 extending radially away from a respective one of the opening 120E1, 120E2. In the illustrated arrangement, the slots 120D1, 120D2 are aligned with one another in the axial direction D1 and in the transverse direction D2 of the sidewalls 120A, 120B, the openings 12E1, 12E2 are likewise aligned with one another in the axial direction D1 and in the transverse direction D2 of the sidewalls 120A, 120B, and the slots 120D1, 120D2 are positioned along the respective sidewalls 120A, 120B between the openings 120E1, 120E2 and the base plate 120C, with the base plate 120C defined along the end 120₁ of the frame 120 and with the openings 120E1, 120E2 defined at or adjacent to the opposite end 122 of the frame 120. In the illustrated embodiment, the base plate 120C is clear of the slots 120D1, 120D2 such that no part of the base plate 120C extends below any portion of the slots 120D1, 120D2, although in alternate embodiments at least a portion of the base plate 120C may extend beneath at least a portion of the slots 120D1, 120D2.

A reaction bar 140 is illustratively provided in the form of an elongated body 142 and an elongated sleeve 144 defining a bore 145 extending axially and centrally through the sleeve 144. In the illustrated embodiment, the elongated body 142 is rectangular in transverse cross-section, as is the bore 145, with each sized such that the elongated body 142 is axially received within the bore 145. The length of the elongated body 142 is selected such that opposite ends 142A, 142B extend into respective ones of the slots 120D1, 120D2 defined in the sidewalls 120A, 120B of the frame 120 with the elongated boy positioned transversely between the sidewalls 120A, 120B. The length of the sleeve 144 is illustratively selected such that, with the elongated body 142 inserted into the bore 145 and the opposed ends 142A, 142B of the elongated body 142 received within the respective slots 120D1, 120D2, the opposed ends of the sleeve 144 are adjacent to, or in contact with, the inner surfaces of the sidewalls 120A, 120B.

The elongated sleeve 144 is illustratively depicted as being oval-shaped or approximately oval-shaped in transverse cross-section, although in alternate embodiments the elongated sleeve 144 may have any cross-sectional shape so long as the web-clamping portion of the sleeve 144 which, along with the web clamping assembly 160, engages and clamps the web 50 therebetween (see FIGS. 11 and 12) to prevent excursion of the web 50 (i.e., to prevent movement of the web 50, relative to the web length adjuster 100, along the longitudinal direction of the web 50), is shaped complementarily to the respective web-clamping surface of the web clamping assembly 160, as will be described more fully below.

The rectangularly-shaped ends 142A, 142B of the elongated body 142 of the reaction bar 140 are illustratively sized complementarily to the slots 120D1, 120D2 defined through the sidewalls 120A, 120B of the frame 120, such that the ends 142A, 142B are each configured to be received within a respective one of the slots 120D1, 120D2 to operatively mount the reaction bar 140 to the frame 120 with the reaction bar 140 extending transversely between the sidewalls 120A, 120B. Illustratively, the lengths and widths of the ends 142A, 142B of the elongated body 142 of the reaction bar 140 are selected to be less than the corresponding lengths of the slots 120D1, 120D2 in the axial direction D1 of the sidewalls 120A, 120B and the widths of the slots 120D1, 120D2 in the transverse direction D2 of the sidewalls 120A, 120B respectively, so as to allow the ends 142A, 142B to be slidably received, and movable, within and relative to respective ones of the slots 120D1, 120D2 between opposite ends A, B of the slots 120D1, 120D2 while also retaining and maintaining the ends 142A, 142B within the slots 120D1, 120D2 such that the elongated body 142, and the sleeve 144 received thereon, extends transversely between the sidewalls 120A, 120B of the frame 120 and is movable in the axial direction D1 of the sidewalls 120A, 120B between the ends A, B of the slots 120D1, 120D2 as described above with respect to the embodiment illustrated in FIGS. 1-6. In alternate embodiments, either or both of the ends 142A and 142B of the elongated body 142 of the reaction bar 140 and/or either or both of the slots 120D1 and 120D2 may be non-rectangular and may have any cross-sectional shape so long as the ends 142A, 142B of the elongated body 142 of the reaction bar 140, and thus the reaction bar 140 itself, are movable relative to and along the slots 120D1, 120D2, in the longitudinal direction D1 of the frame sidewalls 120A, 120B, to and between the opposite ends A, B of the slots 120D1, 120D2. In still other alternate embodiments, the elongated body 142 of the reaction bar 140, and thus the reaction bar 140 itself, may be secured to the sidewalls 120A, 120B of the frame 120 such that the reaction bar 140 is not movable relative to and along the slots 120D1, 120D2 in the longitudinal direction D1 of the frame sidewalls 120D1, 120D2.

In the embodiment illustrated in FIGS. 7-12, the web clamping assembly 160 illustratively includes a clamping handle 170 and a pin or axle 176 configured to pivotably mount the clamping handle 170 to the frame 120 such that the clamping handle 170 will be rotatable about the pin or axle 176 relative to the frame 120. The clamping handle 170 illustratively includes an elongated clamping handle body 170A and a handle grip 170B extending away from the handle body 170A at least partially along the length of the handle body 170A. Upon mounting of the clamping handle 170 to the frame 120, the handle grip 170B will extend generally away from the end 1202 of the frame 120 as illustrated by example in FIGS. 7 and 10-12. The clamping handle body 170A illustratively defines a web-clamping surface 172 configured to clamp the web 50 against a respective web-clamping surface defined by a portion of the sleeve 144 of the reaction bar 140 to prevent excursion of the web 50. The web-clamping surface 172, with the clamping handle 170 pivotably mounted to the frame 120, illustratively extends transversely between the sidewalls 120A, 120B of the frame 120 so as to extend substantially parallel with the reaction bar 140. The web-clamping surface of the sleeve 144 of the reaction bar 140 and the web-clamping surface 172 of the clamping handle 170 may extend fully between the sidewalls 120A, 120B of the frame 120 as illustrated by example in FIGS. 7-12, or may instead extend only partially between the sidewalls 120A, 120B of the frame 120.

The web-clamping surface 172 of the clamping handle 170 is illustratively configured to grip or to enhance gripping of the web 50, and in the embodiment illustrated in FIGS. 7-12 the web-clamping surface 172 defines a plurality of spaced-apart teeth, each of which illustratively extend along the length of the web-clamping surface 172, i.e., such that the teeth extend transversely between the sidewalls 120A, 120B of the frame 120 and run parallel with the elongated sleeve 144 of the reaction bar 140. In the illustrated embodiment, the web-clamping surface 172 defines four such spaced-apart teeth $174_1$-$174_4$ each extending continuously along the length of the web-clamping surface 172 of the body 170A of the clamping handle 170. In some alternate embodiments, one or more of the teeth $174_1$-$174_4$ may not be continuous and may instead be provided in the form of a series of space-apart teeth extending at least partially along the length of the web-clamping surface 172. In some alternate embodiments, the web-clamping surface 172 may define more or fewer than four such teeth $174_1$-$174_4$. In other alternate embodiments, one or more (or all) of the teeth $174_1$-$174_4$ may be omitted, and the web-clamping surface 172 may be treated, machined, processed, coated, fabricated chemically, electrically and/or mechanically altered or otherwise configured in any random or defined pattern so as to grip or enhance gripping of the web 50. In the embodiment illustrated in FIGS. 7-12, the portion of the outer surface of the sleeve 144 of the reaction bar 140 against which the clamping surface 172 clamps the web 50, i.e., the web-clamping surface of the reaction bar 140, is depicted as a similarly toothed or ribbed surface. In alternate embodiments, the web-clamping surface of the sleeve 144, or the entirety of the outer surface of the sleeve 144, may be generally smooth or may be treated, machined, processed, coated, fabricated, chemically, electrically and/or mechanically altered or otherwise configured in any random or defined pattern so as to grip or enhance gripping of the web 50.

The body 170A of the clamping handle 170 illustratively defines a bore or passageway 170C longitudinally therethrough, and an elongated channel 170D extending radially away from the passageway 170C. A biasing member 180 is configured to be axially received within the bore or passageway 170C, and is configured to normally bias the web clamping assembly 160 to an unactuated position relative to the frame 120 in which a web 50 is trapped between the web-clamping surface 172 of the clamping handle 170 and the respective web-clamping surface of the reaction bar 140, defined by a portion of the outer surface of the sleeve 144 of the reaction bar 140 as described above. By applying an appropriately oriented force to the handle grip 170B of the clamping handle 170 that is greater than the biasing force of the biasing member 180, the web clamping assembly 160 can be manually actuated to an actuated position relative to the frame 120 in which the web-clamping surface 172 of the clamping handle 170 is drawn away from the reaction bar 140 to allow the web 50 to pass therebetween for purposes of adjusting the length the web 50. The actuated position of the web clamping assembly 160 is illustratively depicted by example in FIG. 10, and the unactuated position of the web clamping assembly 160 is illustratively depicted by example in FIGS. 11 and 12.

In the illustrated embodiment, the biasing member 180 is an elongated structure including two spaced-apart coiled sections 182A, 182B, an elongated linear member 184 extending between the coiled sections 182A, 182B, an attachment leg 186A coupled to and extending from the coiled section 182A and another attachment leg 186B coupled to and extending from the coiled section 182B. The coiled sections 182A, 182B each illustratively have inner diameters sized to receive the pin or axle 176 therethrough and outer diameters sized to be received within the bore or passageway 170C defined through the body 170A of the clamping handle 170, and the elongated linear member 184 is illustratively sized and configured to be received within the channel 170D extending radially away from the bore or passageway 170C so as to rotationally fix the biasing member 180 to the body 170A of the clamping handle 170. The mounting legs 186A, 186B are each illustratively sized and configured to be received within a respective one of the channels 120F1, 120F2 extending radially away from a respective one of the opening 120E1, 120E2 defined through the respective sidewalls 120A, 120B of the frame 120 so as to fix the ends of the biasing member 180 to the sidewalls 120A, 120B of the frame 120. The combination of the handle body 170 and the biasing member 180 operatively coupled thereto is positioned between the sidewalls 120A, 120B of the frame 120 such that the bore or passageway 170C aligns with the openings 120E1, 120E2 defined through the sidewalls 120A, 120B respectively. The mounting legs 186A, 186B are inserted into the channels 120F1, 120F2 of the sidewalls 120A, 120B, and the pin or axle 176 is passed through the openings 120E1, 120E2, the bore or passageway 170C and the coiled sections 182A, 182B of the biasing member 180 to pivotably (or rotatably) mount the clamping handle 170 to and between the sidewalls 120A, 120B of the frame 120. The clamping handle 170 rotates about the pin or axle 176 relative to the sidewalls 120A, 120B of the frame 120.

With the biasing member 180 coupled to and between the web clamping assembly 160 and the sidewalls 120A, 120B as just described, the coiled sections 182A, 182B act to bias the handle assembly 160 to the unactuated position described above and illustrated by example in FIG. 4. In some alternate embodiments, the biasing member 180 may instead be configured to be coupled to and between the clamping handle 170 and the reaction bar 140. Alternatively still, the biasing member 180 may, in any embodiment, include two or more biasing members.

Figure 10:
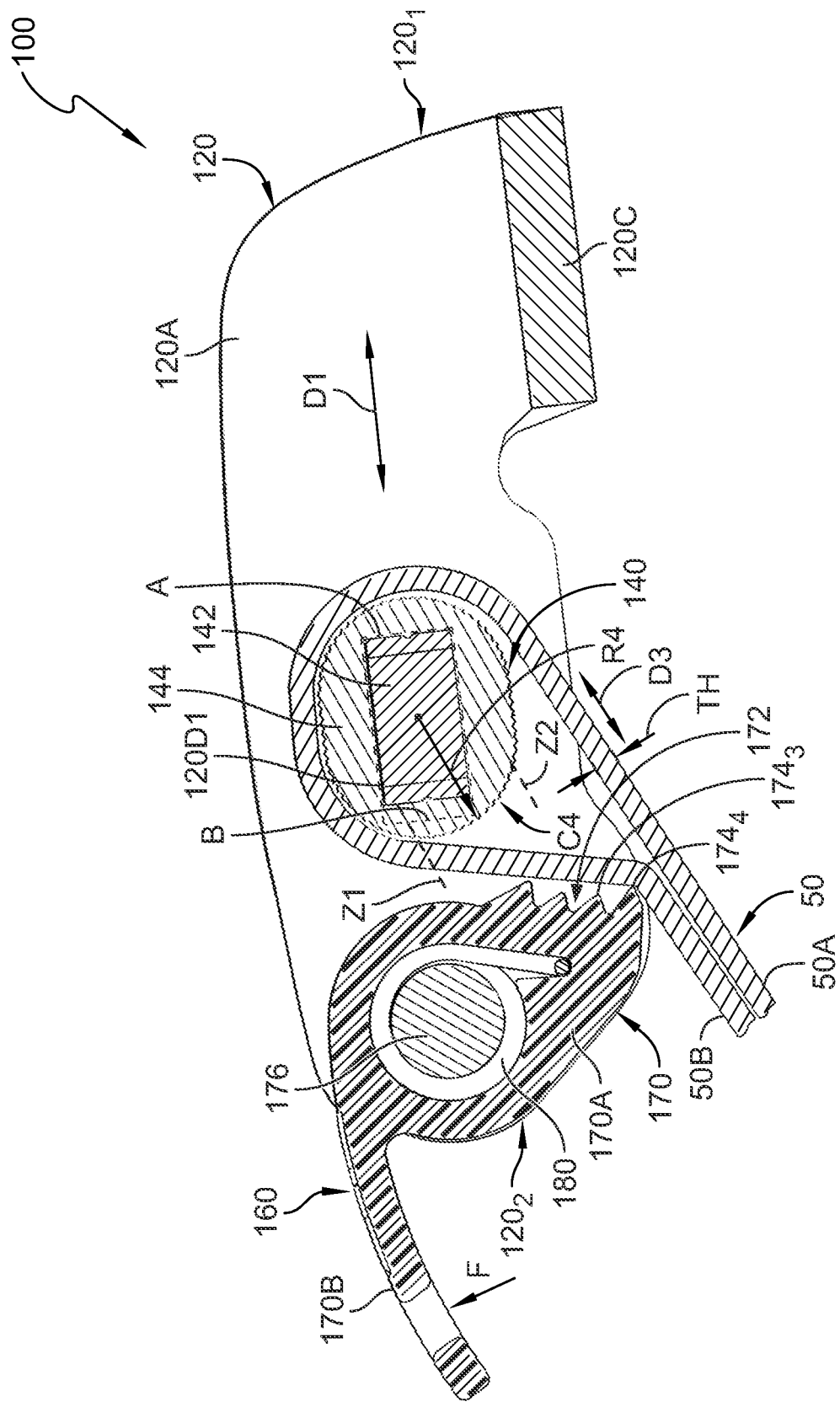
FIG. 10 is a cross-sectional view of the web length adjuster of FIG. 1 as viewed along section lines 10-12-10-12, shown with a restraint web operatively coupled thereto and shown in an actuated state to allow for adjustment of a length of the restraint web.
Figure 11:
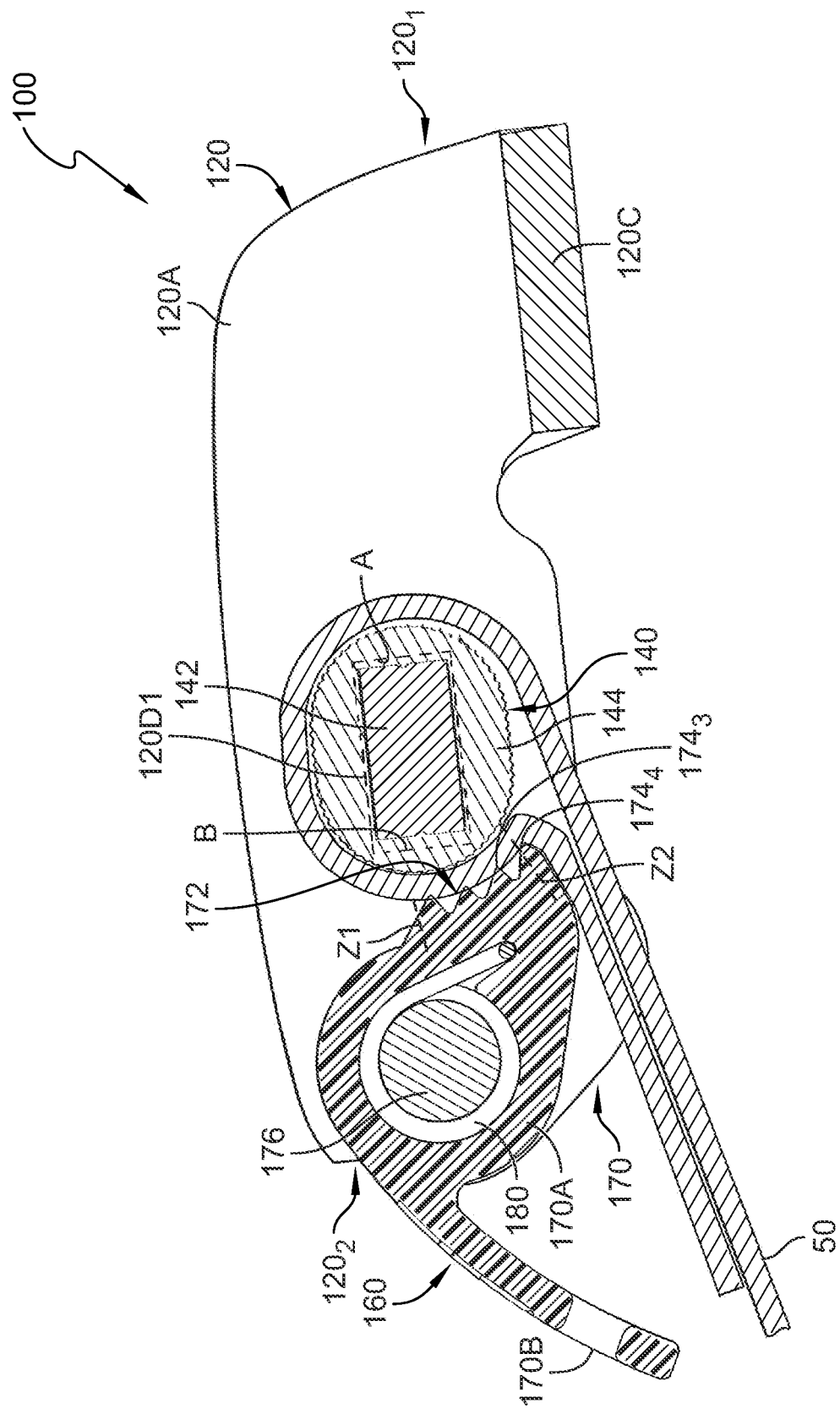
FIG. 11 is a cross-sectional view similar to FIG. 10 with the web length adjuster shown in an unactuated state to clamp the restraint web thereto under conditions in which no external load is applied to the web.
Figure 12:
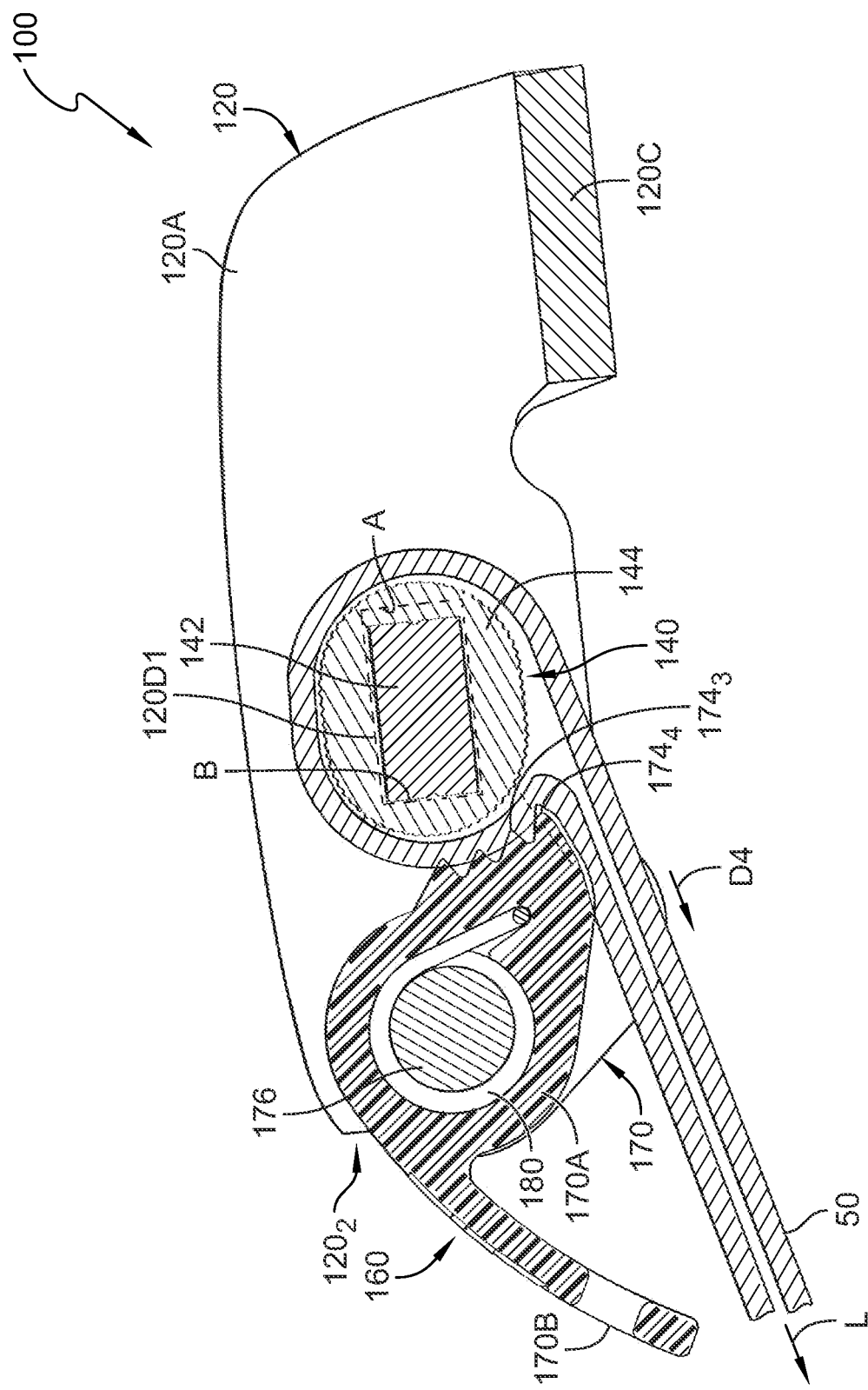
FIG. 12 is a cross-sectional view similar to FIG. 11 with the web length adjuster shown in an unactuated state to clamp the restraint web thereto under conditions in which an external load is applied to the web.

The web-clamping surface 172 of the clamping handle 170 and the web-clamping surface of the outer surface of the sleeve 144 of the reaction bar 140 against which the clamping surface 172 clamps the web 50 with the handle assembly 160 in the unactuated position, as illustrated by example in FIGS. 11 and 12, are illustratively shaped complementarily to one another in a manner configured to grip or to enhance gripping of the web 50. As illustrated by example in FIG. 9, the teeth $174_1$-$174_4$ defined by the web-clamping surface 172 are arranged so as to define a concave surface along a curvature C3 defined by and sequentially along the teeth $174_1$-$174_4$ such that the web-clamping surface 172 is concave in cross-section, and as illustrated by example in FIG. 10 the web-clamping surface of the reaction bar 140, i.e., the portion of the sleeve 144 of the reaction bar 140 defined between the imaginary boundaries z1, z2, defines a convex curvature C4 between z1 and z2. In the illustrated embodiment, the curvature C3 is at least approximately circular so as to define a radius of curvature R3, and the curvature C4 is likewise illustratively at least approximately circular so as to define a radius of curvature R4.

The radii of curvature R3 and R4 are illustratively configured to be matched to one another taking into account the thickness TH of the web 50 (see FIG. 10). In other words, the radii of curvature R3 and R4 are not equal, but rather R3 is illustratively greater than R4 by approximately the thickness TH of the web 50. This arrangement illustratively ensures that, with the handle assembly in the unactuated position (FIGS. 11 and 12), all of the teeth $174_1$-$174_4$ defined by the web-clamping surface 172 of the clamping handle 170 will engage the web 50 and force the engaged portion of the web 50 onto all of the respective web-clamping surface of the sleeve 144 of the reaction bar 140 defined between z1 and z2, such that all of the teeth $174_1$-$174_4$ will bear against all of the respective web-clamping surface of the sleeve 144 of the reaction bar 140 defined between z1 and z2 with the web 50 clamped therebetween. In alternate embodiments, the curvature C3 may not be circular and/or the web-clamping surface of the sleeve 144 of the reaction bar 140, defined between z1 and z2 against which the web-clamping surface 172 clamps the web 50 with the handle assembly 160 in the unactuated position, may not be circular, although in any case the curvatures C3 and C4 will each be configured in a manner which ensures that, with the handle assembly 160 in the unactuated position (FIGS. 11 and 12), most or all of the teeth $174_1$-$174_4$, or other web engaging surface, defined by the web-clamping surface 172 of the clamping handle 170 will bear against most or all of the respective web-clamping surface of the sleeve 144 of the reaction bar 140 defined between z1 and z2 with the web 50 clamped therebetween. It will be understood that, in some alternate embodiments, the web-clamping surface 172 of the clamping handle 170 may define the convex curvature, and the web-clamping surface of the sleeve 144 of the reaction bar 140, defined between z1 and z2 against which the clamping surface 172 clamps the web 50, with the handle assembly 160 in the unactuated, position may define the concave curvature matched to the convex curvature of the clamping surface 172 as described above so as to grip or enhance gripping of the web 50 therebetween as described above.

As described above with respect to the embodiment illustrated by example in FIGS. 1-6, the "floating" mounting arrangement of the reaction bar 140 to and between the slots 120D1, 120D2 of the respective sidewalls 120A, 120B of the frame 120 illustratively serves to enhance both length adjustment of the web 50, in the actuated position of the handle assembly 160, and gripping of the web 50 between the handle assembly 160 and the reaction bar 140, in the unactuated position of the handle assembly 160. The former case is illustrated by example in FIG. 10 which shows the handle assembly 160 manually actuated to the actuated position thereof by application of a force F applied to the handle grip 170B generally in the direction shown. With the force F greater than the biasing force of the biasing member 180, the handle assembly 160 rotates about the pin or axle 176 relative to the sidewalls 120A, 120B of the frame 160 so as to draw the web-clamping surface 172 of the clamping handle 170 away from the web-clamping surface of the sleeve 144 of the reaction bar 140. Doing so causes the body 170A of the clamping handle 170 to act against the web 50 to nudge the reaction bar 140 in the axial direction D1 of the elongated sidewalls 120A, 120B until the ends 142A, 142B of the elongated body 142 of the reaction bar 140 reach the ends A of the slots 120D1, 120D2, as depicted in FIG. 10. This maximizes the distance between the web-clamping surface 172 of the handle assembly 160 and the web-clamping surface of the reaction bar 140, and thus more freely and easily allows either portion 50A, 50B of the web 50 to be manually drawn in the direction D3 to adjust the length of the web 50 than if the ends 142A, 142B of the elongated body 142 of the reaction bar 140, and thus the reaction bar 140 itself, were displaced away from the ends A of the slots 120D1, 120D2 towards the web-clamping surface 172 of the handle assembly 160.

As depicted by example in FIG. 11, no external load is applied to the web 50 and the handle assembly 160 is in the unactuated position in which the biasing member 180 acting between the handle assembly 160 and the sidewalls 120A, 120B forces the web-clamping surface 172 of the clamping handle 170 toward and into engagement with the web-clamping surface of the sleeve 144 of the reaction bar 140 defined between z1 and z2 to clamp the web 50 therebetween. The biasing force of the biasing member 180, along with the dimensions, configurations and relative positions of the handle assembly 160 and the reaction bar 140, are selected so as to apply a clamping force to the web 50 which prevents excursion of the unloaded web 50 relative to the web length adjuster 100. With no external load applied to the web 50, the biasing force applied by the biasing member 180 through the handle assembly 16 illustratively positions the ends 142A, 142A of the elongated body 142 of the reaction bar 140 between the opposed ends A, B of the slots 120D1, 120D2 defined through the sidewalls 120A, 120B of the frame 120, as illustrated by example in FIG. 11.

With the handle assembly 160 in the unactuated position so as to clamp the web 50 between the web-clamping surface 172 of the clamping handle 170 and the web-clamping surface of the sleeve 144 of the reaction bar 140, as illustrated by example in FIG. 11, an external load may, at some point be applied to the web 50 by a seat occupant being restrained by a restraint harness of which the web 50 is part, e.g., by voluntary movement of the occupant, and/or by involuntary movement of the occupant resulting from normal operating conditions of the motor vehicle and/or resulting from an impact, rollover or other motor vehicle event, or the like. Such an external load, L, acting on the web 50 is depicted by example in FIG. 12, and this load L is transferred through the web 50 to act on the reaction bar 140 in the direction D4. The force of this load L acting on the reaction bar 140 in the direction D4 causes the ends 142A, 142B of the reaction bar 140 to move within and relative to the slots 120D1, 120D2 toward, and with a load L of sufficient force, to the ends B of the slots 120D1, 120D2 as depicted by example in FIG. 12. With the handle assembly 160 in the unactuated position, such movement of the reaction bar 140 in response to application of the external load L to the web 50 forces the web-clamping surface of the sleeve 144 of the reaction bar 140 further toward the web-clamping surface 172 of the clamping handle 170, thereby strengthening the holding force and grip on the web 50 by the combination of the handle assembly 160 and reaction bar 140 to ensure prevention of any excursion of the web 50 relative to the web length adjuster 100 under the load L on the web 50. In embodiments in which the web-clamping surface 172 of the clamping handle 170 and/or the web-clamping surface of the sleeve 144 of the reaction bar 140 include(s) one or more grip-enhancing structures, such grip enhancing structures will be forced during such loading of the web 50 into or against, or further into or against, the web 50 to further enhance gripping of the web 50. This feature is depicted by example in FIG. 12 with the teeth 174₁-174₄ shown forced at least partially into the web 50.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected. For example, whereas the reaction bar 14 is illustrated and described as being of unitary (i.e., one piece) construction, it will be understood that the reaction bar 14 may alternatively be formed of two or more structural pieces coupled together (slidingly coupled and/or fixedly coupled). Likewise, whereas the reaction bar 140 is illustrated and described as being formed of two pieces 142 and 144, in alternate embodiments the reaction bar 140 may be a single piece or may be formed of three or more structural pieces coupled together.

What is claimed is:

1. A web length adjuster, comprising:
    a frame having a base and spaced-apart, elongated sidewalls each extending away from a respective side of the base, the elongated sidewalls each defining a slot,
    a reaction bar mounted to and between the sidewalls with respective ends of the reaction bar extending into the sidewall slots such that the reaction bar is movable along the slots in a longitudinal direction of the elongated sidewalls, the reaction bar defining a first web clamping surface between the sidewalls of the frame,
    a handle assembly rotatably mounted to and between the sidewalls, the handle assembly defining a second web clamping surface extending between the sidewalls of the frame and configured complementarily to the first web clamping surface, the handle assembly rotatable relative to the frame between a first position to clamp a web of a vehicle occupant restraint web between the first and second clamping surfaces and a second position to allow the web to pass between the first and second clamping surfaces, and
    a biasinq member coupled to and between the handle assembly and the frame or the reaction bar, the biasinq member biasinq the handle assembly to the first position,
    wherein the handle assembly is configured to move, under force applied to the handle assembly greater than a biasinq force of the biasinq member, from the first position to the second position,
    and wherein, with the handle assembly in the first position, the reaction bar is responsive to load applied to the web to move within the slots toward the handle assembly to force the first web-clamping surface against the second web-clamping surface with the web clamped therebetween.

2. The web length adjuster of claim 1, wherein the first and second clamping surfaces define opposite curvatures in transverse cross-section.

3. The web length adjuster of claim 2, wherein the first clamping surface defines a first curvature, and the second clamping surface defines a second curvature, the first curvature matched with the second curvature taking into account a thickness of the web.

4. The web length adjuster of claim 1, wherein one of the first and second clamping surfaces is concave in transverse cross-section and the other of the first and second clamping surfaces is convex in transverse cross-section.

5. The web length adjuster of claim 1, wherein at least one of the first and second web-clamping surfaces is at least one of treated, machined, coated or fabricated to grip, or enhance gripping of, the web.

6. A web length adjuster, comprising:
    a frame having spaced-apart sidewalls each defining a slot therethrough,
    a handle rotatably mounted to the sidewalls, the handle defining a first web clamping surface extending at least partially between the sidewalls,
    a reaction bar received within the slots of the sidewalls and defining a second web clamping surface extending at least partially between the sidewalls, the reaction bar movable along the slots toward and away from the handle, and
    a biasing member coupled to and between the handle and the frame or the reaction bar, the biasing member biasing the handle with a biasing force to rotate the handle to a first position to clamp a web of a vehicle occupant restraint web between the first and second web clamping surfaces,
    wherein, with the handle in the first position, the reaction bar is responsive to load applied to the web to move toward the handle to force the second web clamping surface against the first web clamping surface with the web clamped therebetween.

7. The web length adjuster of claim 6, wherein one of the first and second clamping surfaces is concave in transverse cross-section and the other of the first and second clamping surfaces is convex in transverse cross-section.

8. The web length adjuster of claim 7, wherein the concave and convex surfaces each define respective curvatures matched to one another taking into account a thickness of the web.

9. The web length adjuster of claim 6, wherein the first web clamping surface defines a first curvature, and the second web clamping surface defines a second curvature, the first curvature matched with the second curvature taking into account a thickness of the web.

10. The web length adjuster of claim 6, wherein the first curvature defines one of a concave surface and a convex surface, and the second curvature defines the other of a concave and a convex surface.

11. The web length adjuster of claim 6, wherein at least one of the first and second web clamping surfaces is at least one of treated, machined, coated or fabricated to grip, or enhance gripping of, the web.

12. The web length adjuster of claim 6, wherein the first web clamping surface defines a plurality of spaced-apart teeth or ribs each extending along the handle assembly transversely between the sidewalls of the frame.

13. The web length adjuster of claim 12, wherein the second web clamping surface defines a plurality of spaced-apart teeth or ribs each extending along the reaction bar transversely between the sidewalls of the frame.

14. The web length adjuster of claim 6, wherein the handle is configured to rotate, under an applied force greater than the biasing force of the biasing member, from the first position to a second position to allow the web to pass between the first and second web clamping surfaces.

15. The web length adjuster of claim 14, wherein one of the first and second clamping surfaces is concave in transverse cross-section and the other of the first and second clamping surfaces is convex in transverse cross-section.

16. The web length adjuster of claim 15, wherein the concave and convex surfaces each define respective curvatures matched to one another taking into account a thickness of the web.

\* \* \* \* \*